United States Patent
Schneider et al.

(10) Patent No.: US 6,290,217 B1
(45) Date of Patent: Sep. 18, 2001

(54) ASYMMETRIC WIRE ROPE ISOLATOR

(75) Inventors: Stefan Schneider, Hamburg; Kenneth A. Dickerson, Wellsville; Michael Latvis, Orchard Park, all of NY (US)

(73) Assignee: Enidine Incorporated, Orchard Park, NY (US)

( * ) Notice: Subject to any disclaimer, the term of this patent is extended or adjusted under 35 U.S.C. 154(b) by 0 days.

(21) Appl. No.: 09/537,918

(22) Filed: Mar. 29, 2000

(51) Int. Cl.⁷ .................................................. F16F 1/36
(52) U.S. Cl. .................. 267/148; 29/896.93; 267/136; 267/166; 188/378; 248/570
(58) Field of Search .................. 267/148, 149, 267/166, 136, 160, 169, 158, 164; 29/505, 896.93; 248/570, 638, 626, 636, 901, 618, 318, 628; 188/378

(56) References Cited

U.S. PATENT DOCUMENTS

| | | | |
|---|---|---|---|
| 3,044,759 | * 7/1962 | Kerley, Jr. | 267/148 |
| 3,360,225 | * 12/1967 | Camossi . | |
| 3,596,865 | * 8/1971 | Camossi | 267/160 |
| 4,190,227 | * 2/1980 | Belfield et al. | 248/636 |
| 4,397,069 | * 8/1983 | Camossi | 29/896.93 |
| 4,783,038 | * 11/1988 | Gilbert et al. | 267/148 |
| 5,062,507 | * 11/1991 | Roche | 188/378 |
| 5,169,110 | * 12/1992 | Snaith et al. | 267/148 |
| 5,240,232 | * 8/1993 | Loziuk . | |
| 5,277,394 | * 1/1994 | Slemmer | 267/166 |
| 5,441,243 | * 8/1995 | Loziuk . | |
| 5,499,790 | * 3/1996 | Hay | 248/570 |
| 5,549,285 | * 8/1996 | Collins . | |
| 5,791,636 | * 8/1998 | Loziuk . | |
| 5,897,093 | * 4/1999 | LeDerf | 248/570 |
| 6,151,216 | * 11/2000 | Vos et al. | 267/148 |
| 6,164,023 | * 12/2000 | Horikin et al. . | |

* cited by examiner

Primary Examiner—Douglas C. Butler
(74) Attorney, Agent, or Firm—Wall Marjama & Bilinski

(57) ABSTRACT

A wire rope isolator having a pair of opposed mounting blocks, each having parallel holes formed therein so that the holes in one block are perpendicular to holes in the second block. One block contains two parallel holes passing through the block while the second contains three parallel holes, one of which passes through the block and the remaining holes being blind holes passing inwardly from opposite sides of the block. One end of the rope is secured in one blind hole and the rope is threaded through the block in a clover leaf pattern and the opposite end secured in the other blind hole.

14 Claims, 3 Drawing Sheets

ASYMMETRIC WIRE ROPE ISOLATOR

BACKGROUND OF THE INVENTION

1. Field of the Invention

This invention relates in general to vibrational energy isolators, and in particular, wire rope isolators. More specifically, but without restriction to the particular embodiment hereinafter described in accordance with the best mode of practice, this invention relates to wire rope vibration isolators employing a minimum of one asymmetric mounting block retaining a disconnected wire rope shaped into an asymmetric loop design.

2. Background of the Prior Art

Excessive vibrational energy can damage and/or cause the deterioration of sophisticated machinery. In industries in which movement is inherent in daily operations, such as avionics and shipping, the need to minimize unwanted vibrational energy is imperative. These industries have come to rely heavily on sensitive electronic equipment, like navigational computers, to maintain daily operations. Constant jostling of electronic equipment can cause system failures that lead to costly downtime to replace and/or repair the damaged equipment.

Over the years, many devices have been designed to isolate damaging vibrations and isolate unwanted kinetic energy. These devices use the unwanted kinetic energy to move simple machinery, like pistons and springs, so as to divert the energy from shock-sensitive equipment attached to the isolator. A good example of a member of this class of devices is the wire rope isolator. The most common wire rope isolators employ a helical wire cable secured between a pair of retaining members. When the isolator is in use, vibrational energy causes the wire rope coil to move in a spring-like fashion, which in turn moves the retaining members vertically toward each other. This movement diminishes the degree of vibrational energy transferred to the affixed sensitive equipment.

The art of wire rope vibration isolators has been contributed to by a number of proposed devices detailed in U.S. Pat. No. 5,549,285 issued to Collins and U.S. Pat. Nos. 5,441,243 and 5,791,636 both issued to Loziuk. These patents describe vibrational energy energy isolators that consist of coiled wire ropes secured between two parallel retaining blocks. Holes drilled into the retaining blocks maintain the helical shape of the wire rope. Vibrational energy causes the wire rope coil to contract which in turn moves the entrapment blocks vertically relative to each other thus absorbing vibrational energy in the process.

There are disadvantages with the helical design. Conventional helical wire rope isolators are ineffective when the support load is a few pounds. In addition, helical wire rope isolators are not well suited for applications with spatial restrictions or significant weight limitations due to the need that the wire coil be of a certain length to be functional. It was therefore desirable to design a wire rope isolator that overcame the limitations associated with traditional helical wire rope isolators. U.S. patent application Ser. No. 09/496, 688, incorporated herein by reference, discloses a wire rope vibration isolator that includes a pair of mounting blocks spaced apart by wire rope manipulated into four U-shaped bights. The bights form a cloverleaf-type pattern between the two blocks. To maintain the bight formation, the mounting blocks are crimped into locking contact with the wire rope. When exposed to vibrational energy, the wire rope bights flex causing the mounting blocks to move toward each other expending the unwanted energy in the process.

The wire rope isolator disclosed in U.S. application Ser. No. 09/496,688 successfully solves the problems associated with traditional helical wire rope isolators. The disclosed isolator is capable of supporting relatively light loads. Due to the simpler design, relatively small-scale wire rope isolators can be constructed for applications having limited space. Manufacturing costs are decreased due to ability to use cheaper materials.

It was discovered, however, that applying a tension force to the wire rope during the crimping process reduced dimensional and stiffness variation in the isolator. The design disclosed in the '688 application employs a continuous loop of wire rope having both ends located in the same hole thus prohibiting the use of a tensile force during the crimping process. It was found that locating both ends of the wire rope in the same retaining hole unnecessarily complicated the manufacturing of the isolator, thus increasing production costs. Accordingly, it is highly desirable to design a wire rope vibrational energy isolator with all of the attributes of the design disclosed in U.S. patent application Ser. No. 09/496,688 while maintaining tensile force in the wire rope during manufacture so that dimensional and stiffness qualities are uniform throughout the isolator.

SUMMARY OF THE INVENTION

It is, therefore, a general object of the present invention to provide a new and. improved wire rope isolator.

It is an object of the present invention to simplify the design of wire rope isolators.

A further object of the present invention is to produce a relatively small-scale isolator for use in applications with spatial limitations.

Still another object of the present invention is to construct a wire rope isolator suited to support relatively light masses.

It is yet a further object of the present invention to manufacture wire rope isolators using cost-effective materials.

An additional objective of the present invention is to develop a method of manufacturing a wire rope isolator using a singular tool and a limited number of fastening means.

Yet a further object of the present invention is to design a wire rope isolator without a closed loop design thus reducing manufacturing error and complexity.

Still yet another objective of the present invention is to be able to maintain tension in the wire rope throughout the crimping process to minimize dimensional and stiffness variation.

These and other objects are attained in accordance with the present invention of a wire rope vibration isolator that includes a pair of mounting blocks spaced apart by a singular wire rope or a number of wire ropes manipulated into a cloverleaf pattern about the blocks. According to one aspect of the present invention, a first mounting block contains, at one end, a pair of closely spaced lateral holes. In the preferred embodiment, one of the pair is a blind hole used to position the end of the wire rope during assembly. The other hole of the pair passes axially therethrough the mounting block. Another through hole is located on the opposite end of the same mounting block. In other embodiments, both holes of the closely spaced pair are either blind or through holes and a pair of holes, instead of one, may be situated at the opposite end of the mounting block.

A second mounting block contains, at opposing ends of the block, two through holes, although in other embodiments of the present invention the second mounting block is although in other embodiments of the present invention the second mounting block is identical to the previously described first mounting block. One end of the wire rope is positioned in the blind hole of the asymmetrical block. The free end of wire rope is arched outward forming a U-shaped bight and then passed completely through the opposing hole of the second mounting block. The wire rope is arched outward again forming a second U-shaped bight between the two mounting blocks. The wire rope is then passed completely through the lone hole of the asymmetric mounting block. The wire rope is again arched outward forming a third U-shaped bight and is passed completely through the empty hole of the second mounting block. A fourth U-shaped bight is formed as the wire rope is arched outward from the second mounting block into the empty hole of the first mounting block. The wire rope is pulled completely therethrough. The tension in the rope is maintained while a crimp is formed at each lateral hole to secure the wire rope in place.

BRIEF DESCRIPTION OF THE DRAWINGS

Further objects of the present invention together with additional features contributing thereto and advantages accruing therefrom will be apparent from the following description of a preferred embodiment of the invention which is shown in the accompanying drawings with like reference numerals indicating like components throughout, wherein.

DETAILED DESCRIPTION OF THE INVENTION

Figure 1:
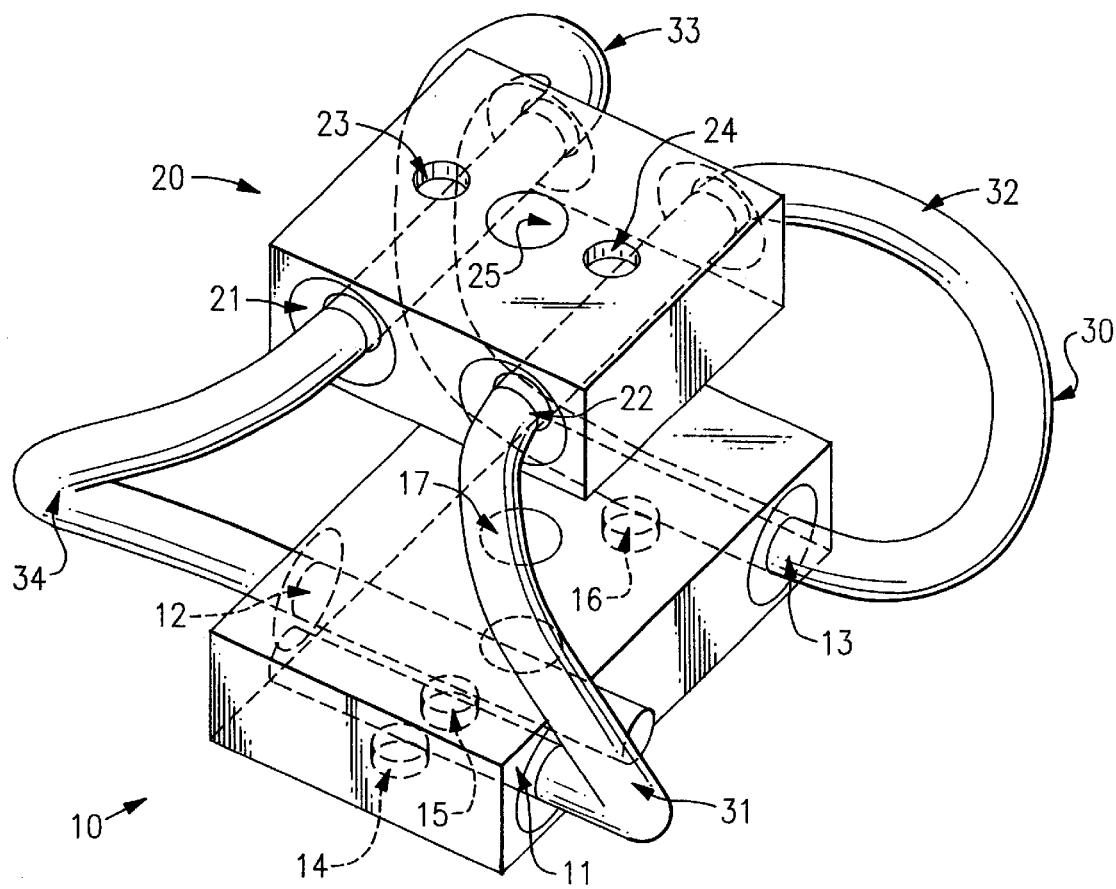
FIG. 1 a perspective view showing the preferred embodiment of an assembled asymmetric wire rope vibration isolator with the portions of the wire rope contained in the mounting blocks shown in phantom.

FIG. 1 shows an assembled asymmetric wire rope isolator in accordance with the present invention. The asymmetric mounting block 10 which is relatively rectangular but can be any other suitable geometry, has a top and a bottom surface, opposing side surfaces and two opposing end surfaces. Two closely spaced lateral holes 11 and 12 are situated at the left end of the asymmetric mounting block 10. (It should be noted that the referenced holes could be situated at the right end of the asymmetric mounting block 10). The lateral hole 11 closest to the left edge of the asymmetric mounting block 10 is a "blind" hole that does not pass completely through the asymmetrical mounting block. The purpose of the blind hole 11 is to align the end of the wire rope 30 during assembly. It is desirable that the blind hole 11 extend beyond the center of the block 10. In the preferred embodiment, a crimping force is applied at the center of the block 10 to plastically deform the mounting block into locking contact with the wire rope 30 contained therein. The crimping process will be described in greater detail later. If the crimp is located at the end of the wire rope 30, it is possible that wire can be pulled out of the mounting block 10 during use or significantly decrease the service life of the isolator due to fatigue of the crimp. To insure the integrity of the isolator, the blind hole 11 should extend well beyond the center of the block 10 so that the crimp is not formed at the end of the rope 30.

The second hole 12 of the pair passes completely therethrough the asymmetric mounting block 10 from one side surface to the other side surface. On the right side of the asymmetric mounting block 10, parallel to the aforementioned pair of closely spaced holes 11 and 12, a "lone" lateral hole 13 passes completely therethrough from one side surface of the asymmetric mounting block 10 to the other side surface of the asymmetric mounting block. In other embodiments of the present invention, both of the closely spaced holes are through holes or blind holes. In addition, the asymmetric mounting block can have two pairs of closely spaced lateral holes at opposing ends of the asymmetric block.

The second mounting block 20, as illustrated, is generally rectangular in shape, but can have any other suitable geometry. The second mounting block 20 generally has a top and bottom surface, opposing side surfaces and two opposing end surfaces. Two parallel lateral holes 21 and 22, located at opposite ends of the second mounting block 20, pass completely therethrough from one side surface of the second mounting block 20 to the other side surface of the second mounting block 20. In another embodiment of the present invention, the second mounting block is identical to the asymmetric mounting block.

To assemble the isolator, one end of the wire rope 30 is passed completely into the "blind hole" 11 of the asymmetric mounting block 10 until it abuts the closed end of said hole. The free end of the wire rope 30 is arched outward and away from the asymmetric mounting block 10 to the second mounting block 20 forming a U-shaped bight 31 between the mounting blocks. The two mounting blocks 10 and 20 should be positioned relative to each other so that the lateral holes 11, 12 and 13 of the asymmetrical mounting block 10 are perpendicular to the lateral holes 21 and 22 of the second mounting block 20. In addition, the two mounting blocks 10 and 20 should be spaced apart so that the U-shaped bights of wire rope 30 retain an elastic quality.

The wire rope 30 is then passed completely through the lateral hole 22 on the second block 20 that is directly across from the originating blind hole 11. The wire rope 30 is arched away from the second mounting block 20 to the lone lateral hole 13 on the right end of the asymmetrical mounting block 10. Another U-shaped bight 32 is formed between the two mounting blocks 10 and 20. After completely passing through the asymmetrical block 20, lone hole 13, the wire rope 30 is once again arched outward forming a U-shaped wire bight 33. The wire rope is then completely passed through the empty lateral hole 21 of the second mounting block 20, arched outward to form a fourth U-shaped bight 34, and then passed completely through the lateral hole 12 of the asymmetrical mounting block 10 adjacent to the immediate right of the blind hole 11. The manipulation of the wire rope is referred to as "winding." The wire rope 30 is preferably wound in this manner to create symmetry about a central axis. The symmetry enables the isolator to retain a preferred shape and provide a particular isolator stiffness.

After the wire rope 30 has been wound about the mounting blocks 10 and 20 as described, the tension applied to wind the wire rope 30 is maintained. The purpose for maintaining the tensile force in the wire rope 30 during and after winding is to minimize dimensional and stiffness variation during the crimping process. By keeping the wire rope 30 taut, the possibility of the wire rope 30 moving before being secured to the mounting blocks 10 and 20 is lessened. If the wire rope 30 moves, the aforementioned preferred symmetry may be lost. In addition, tension in the wire rope 30 facilitates the crimping process by better positioning the assembled wire rope isolator on the crimping apparatus.

Each of the wire rope U-shaped bights 31, 32, 33 and 34 is secured in place by a crimp at each lateral hole 11, 12, 13, 21 and 22. The U-shaped bights 31, 32, 33 and 34 are thereby secured in a fixed position relative to one another. It is desirable to locate each crimp in the center of the mounting block to extend the life of the isolator. A crimp located at the edge of the lateral hole is subjected to fatigue caused by movement of the wire rope 30 during use.

The crimps are formed by exerting a crimping force as described in U.S. patent application Ser. No. 09/496,688, incorporated by reference herein. The crimping force plastically deforms the immediately adjacent material and forms a mechanical bond between the wire rope 20 and the mounting blocks 10 and 20. The crimp extends into the lateral hole bonding the wire rope 30 contained therein. By locating the ends of the wire rope 30 in different lateral holes 11 and 12, only one crimp is required for each lateral hole 11, 12, 13, 21 and 22. Positioning both ends in the same lateral hole requires crimping the hole at two points to secure each end of the wire in place so that it would not unwind during use. In addition, the two crimps could not be located in the center of the mounting block potentially decreasing the service life of the isolator due to fatigue.

After the wire rope is wound as described, the assembled isolator is positioned on a crimping press. The details of the workings of the crimping press are essentially known to those of ordinary skill in the art and do not necessarily form an essential part of the present invention. Therefore, a detailed discussion is not provided, except as required. Due to the unique design of the present invention, it is possible to crimp all of the lateral holes at the same time with the same apparatus. The crimps 14, 15, 16, 23 and 24, as illustrated in FIG. 1, form a line down the center of each mounting block 10 and 20. After applying the crimping force, the assembled wire rope isolator is removed from the press and is ready for use. In another embodiment of the present invention, the wire rope may also be retained between the mounting blocks by dowel pins as described in U.S. patent application Ser. No. 09/496,517 filed by Kosar et al. and incorporated by reference herein.

Threaded retainer holes 17 and 25 are forged in the center of each mounting block 20 and 30 to affix the assembled wire rope isolator to equipment intended to be protected by the isolator.

A chamfer or radius may be situated at the entrance and/or egress of the lateral holes 11, 12, 13, 21, and 22.

Figure 2:
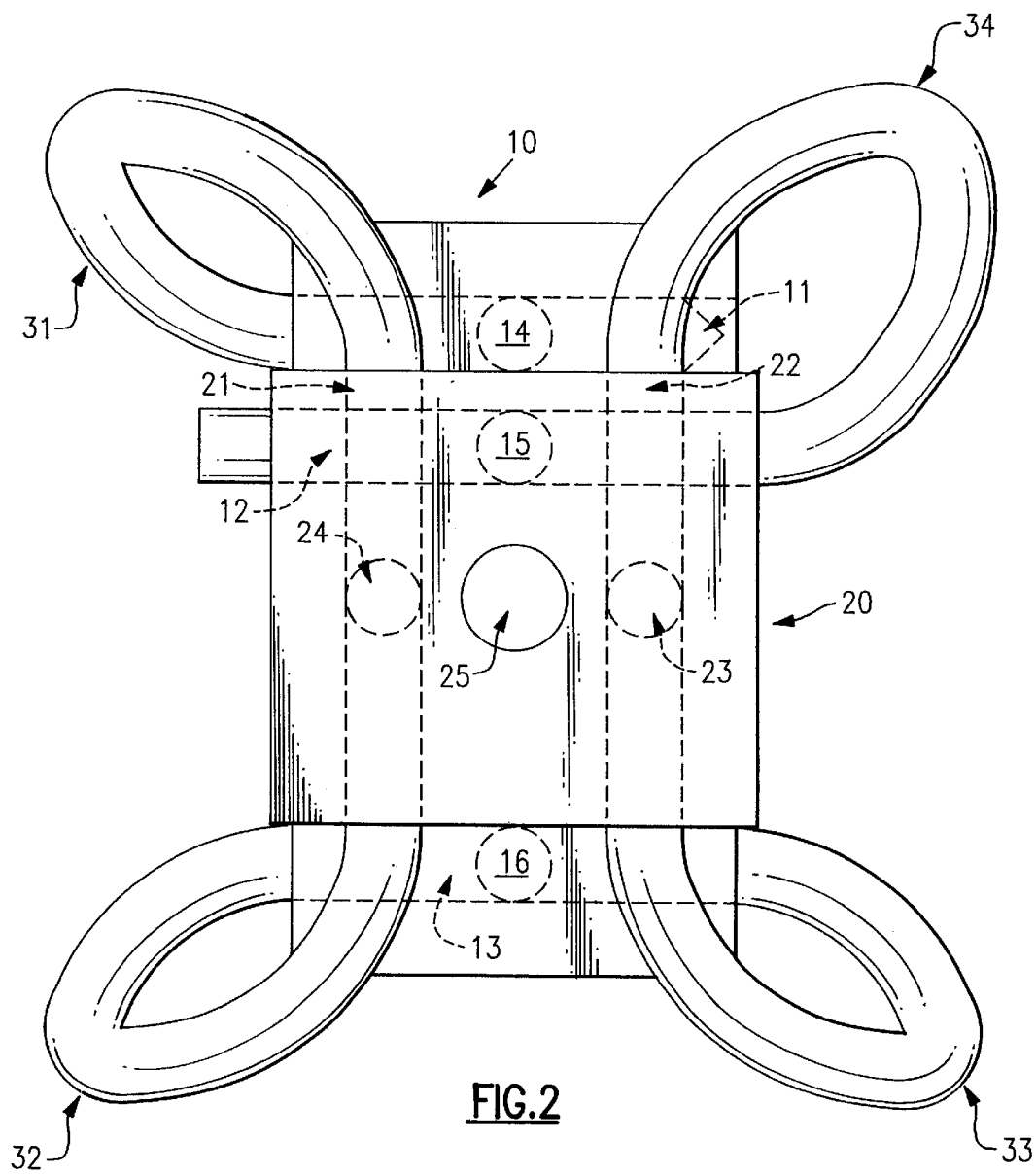
FIG. 2 is an elevated partial perspective view of the preferred embodiment of an asymmetric wire rope vibration isolator referenced from the perspective of the outer surface of the asymmetric mounting block with those portions of the wire rope contained in the holes of the mounting blocks shown in phantom.

FIG. 2 is an elevated perspective of the preferred embodiment of the present invention referenced from the top surface of the second mounting block showing in phantom the portions of the wire rope contained in the lateral holes of the described isolator. In the illustrated embodiment of the present invention, the four wire rope bights 31, 32, 33 and 34 are situated about the mounting blocks 10 and 20 in a cloverleaf pattern. It is preferred that the bights have substantially equal dimensions. A line of crimps 23 and 24 secures the wire rope 30 to the second mounting block 20. The wire rope 30 passes completely therethrough the lateral holes 21 and 22 of the second mounting block 20. The lateral holes 11, 12 and 13 of the asymmetrical mounting block 10 are illustrated as dotted lines. As illustrated, the "blind hole" does not pass completely through the asymmetric mounting block 10. The wire rope 30 is passed into the blind hole 11 until the end wire rope is flush with the closed portion of the hole 11. One end of the wire rope is passed completely through the second 12 of the pair of left-hand holes of the asymmetric mounting block 10. The advantages of placing the ends of the wire rope in different lateral holes have been discussed at length previously. The wire rope passes completely through the lone hole 13 of the asymmetric mounting block 10. The crimps 14, 15 and 16 securing the wire rope 30 to the asymmetrical mounting block are formed generally in a line down the center of the asymmetrical mounting block 10 over each lateral hole as shown.

Figure 3:
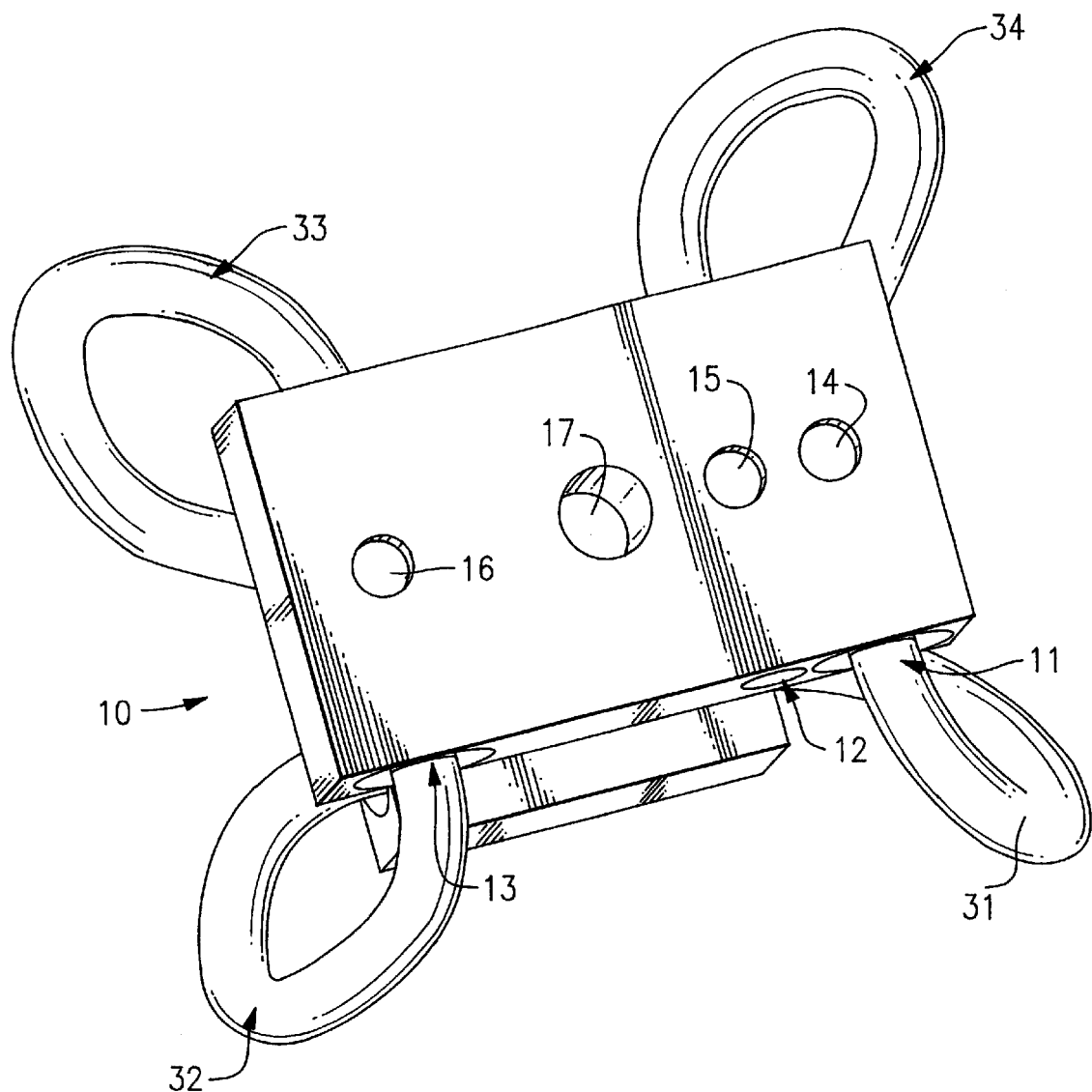
FIG. 3 is an elevated perspective view of the preferred embodiment of an asymmetric wire rope vibration isolator referenced from the outer surface of the asymmetric mounting block.

FIG. 3 depicts an elevated perspective of the present invention referenced from the outer surface of the asymmetrical mounting block 10. The crimps 14, 15 and 16 retaining the wire rope 30 to the asymmetrical mounting block 10 appear as they would after the crimping process according to the preferred embodiment. The threaded fastener 17 of the lower mounting block 30 is also shown.

While this invention has been described in detail with reference to a certain preferred embodiment and preferred method for making the illustrated embodiment, it should be appreciated that the present invention is not limited to those precise embodiments. Rather, in view of the present disclosure which describes the best mode for practicing the invention, many modifications and variations would present themselves to those of skill in the art without departing from the scope and spirit of this invention, as defined in the following claims.

What is claimed is:

1. A wire rope vibration isolator that includes:
    a first and second mounting block, said first mounting block containing at one end a pair of closely spaced parallel holes one of which is a blind hole and the other a lateral hole passing axially therethrough and at the opposite end of said first mounting block a lateral hole passing axially therethrough;
    a second mounting block having at one end a hole passing axially therethrough and at the opposing end a second hole passing axially therethrough;
    wire rope passing into and through said holes to space the blocks apart;
    at least one securing means located at each hole to secure the wire rope into locking contact with the blocks.

2. The wire rope vibration isolator of claim 1, wherein one end of said wire rope is located in said blind hole of the first mounting block and the opposite end of said wire rope is passed completely through the lateral hole adjacent to said blind hole.

3. The wire rope vibration isolator of claim 1, wherein a plurality of outwardly extending wire rope bights having spring-like qualities are formed between said blocks.

4. The wire rope vibration isolator of claim 1, wherein the lateral holes of the first block are perpendicular to the lateral holes of said second block.

5. The wire rope vibration isolator of claim 1, wherein said holes are substantially cylindrical having a diameter slightly greater than said wire rope.

6. The wire rope vibration isolator of claim 1, wherein said securing means consists of a crimp formed at each lateral hole so as to secure said wire rope into locking contact with said mounting blocks.

7. The wire rope vibration isolator of claim 6, wherein said crimp is located at the center of each lateral hole.

8. The wire rope vibration isolator of claim 1, wherein said securing means is a dowel pin driven through said mounting block into each lateral hole so as to stake the wire rope contained therein into locking contact with the mounting block.

9. The wire rope vibration isolator of claim 1, wherein both of the closely spaced parallel holes of the first mounting block are blind holes.

10. The wire rope vibration isolator of claim 1, wherein both of the closely spaced parallel holes of the first mounting block are through holes.

11. The wire rope vibration isolator of claim 1, wherein each lateral hole contains a chamfer at the exit and entrance of the hole.

12. The wire rope vibration isolator of claim 1, wherein each lateral hole contains a radius at entrance and exit of the hole.

13. The wire rope isolator of claim 1, wherein said mounting blocks are composed of metal.

14. The wire rope isolator of claim 1, wherein said mounting blocks are composed of aluminum.

* * * * *